Nov. 8, 1932.　　　P. L. TENNEY　　　1,886,848
GEAR SHIFT MECHANISM
Filed Oct. 19, 1931　　2 Sheets-Sheet 1
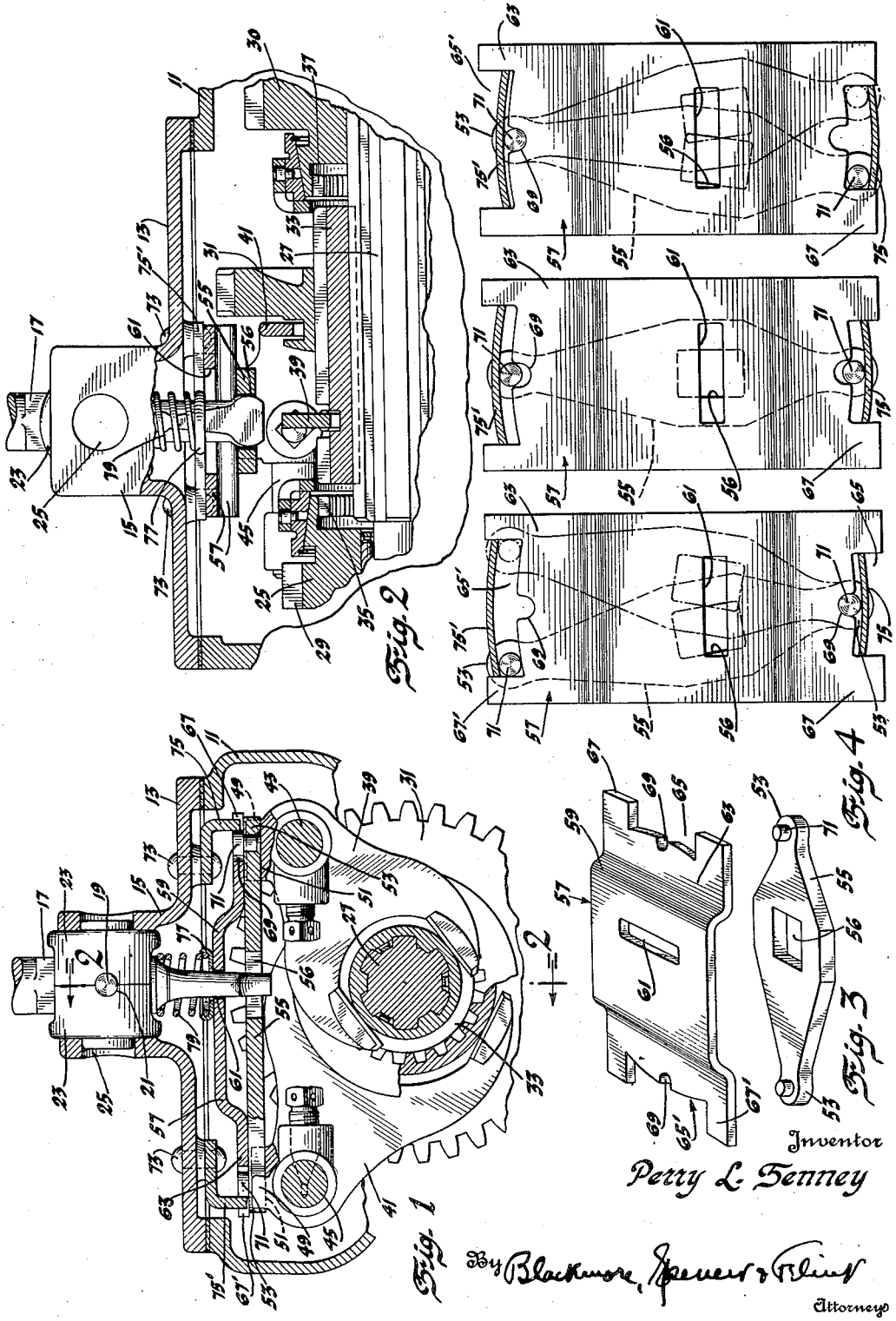
Inventor
Perry L. Tenney
By Blackmore, Spencer & Kling
Attorneys Nov. 8, 1932.  P. L. TENNEY  1,886,848
GEAR SHIFT MECHANISM
Filed Oct. 19, 1931  2 Sheets-Sheet 2
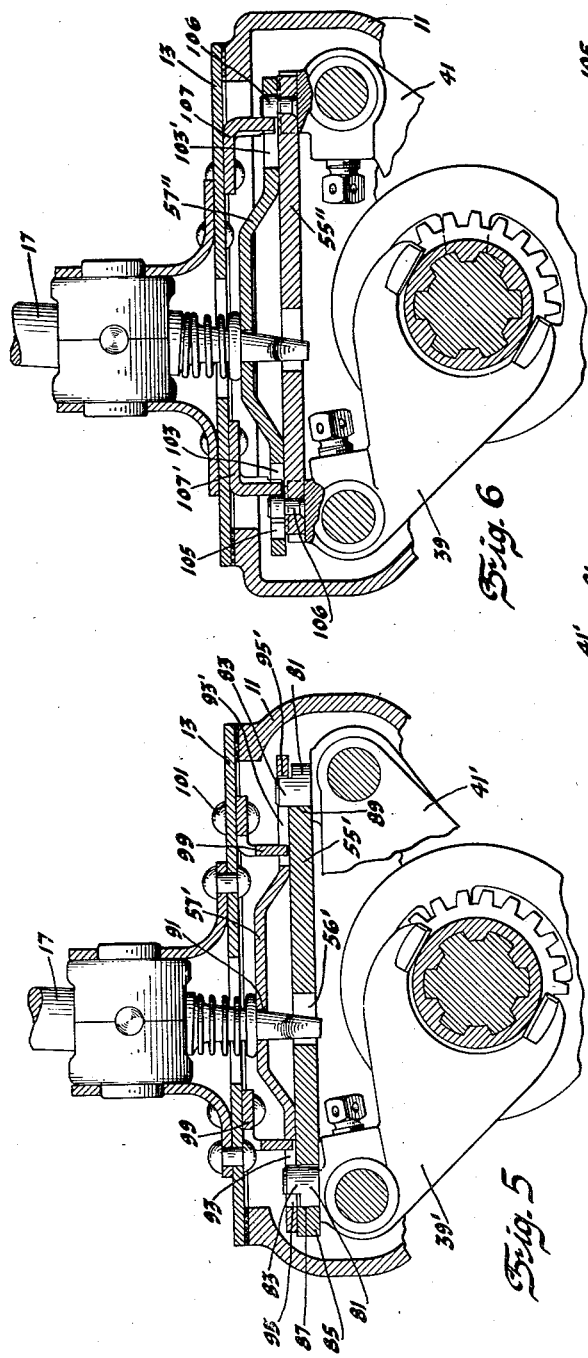
Inventor
Petty L. Tenney
By Blackmore, Spencer & Flint
Attorneys Patented Nov. 8, 1932

1,886,848

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

GEAR SHIFT MECHANISM

Application filed October 19, 1931. Serial No. 569,747.

This invention relates to operating means for change speed mechanism.

An object is to provide an improved mechanism by which the one or the other of two shift forks is moved while the opposite fork is held from movement.

As a further object the invention is designed in such a way that equal movements of the upper end of the shift lever may produce movements of unequal magnitude in the forks associated with the lever for shifting the gearing to produce different driving ratios.

Other objects will be understood from the following description.

Accompanying this description are drawings in which—

Fig. 1 is a transverse section through the novel shifting device.

Fig. 2 is a longitudinal section on line 2—2 of Fig. 1.

Fig. 3 is a perspective of two related parts constituting a portion of the shifting mechanism.

Fig. 4 is a diagrammatic view showing several positions of adjustment.

Fig. 5 is a transverse section of a modified form.

Fig. 6 is a transverse section of still another modification.

Fig. 7 is a diagrammatic view showing two forms of adjustment of the embodiment illustrated in Fig. 5.

Fig. 8 is a diagrammatic view illustrating an adjusted position of the mechanism shown in Fig. 6.

In Figs. 1 to 4 inclusive numeral 11 represents a transmission housing and 13 is a cover for the housing. The cover is provided with a dome 15 in which is mounted for universal movement a shift lever 17.

The universal mounting is not a part of this invention and is not claimed herein. It employs a pin 19 carried by the lever 17 and located in recesses made in slots 21 in two members 23. Rotation of the lever 17 on pin 19 gives the lever its transverse rocking movement. Rotation of the lever with a longitudinal rocking movement takes place together with a similar rocking movement of the two members 23 jointly. Openings 25 in the wall of the dome are provided for supplying bearings to pivot the members 23 in their movement of longitudinal rocking.

The transmission gearing is not a part of this invention. The shift mechanism is shown in Fig. 2 as applied to a known form of change speed mechanism. There is illustrated in this figure a clutch driven shaft 25, and a splined shaft 27. There is, as usual, a parallel countershaft which is to be driven by gear 29 on shaft 25. Rotatable on the splined shaft is a second speed driven gear 30 to be constantly rotated by a gear meshing therewith and located on the countershaft, not shown. There are other gears on the countershaft as usual, and an idler gear driven by a countershaft gear. One of these other countershaft gears and the idler are to be independently engaged by a gear 31. Gear 31 is slidably splined on a clutch member 33 which is itself slidably splined on the countershaft 27. The clutch member 33 is shown as having the now well-known synchro-mesh clutch engagement with either the clutch teeth 35 of the driving shaft or with the teeth 37 of the second speed driven gear 30. Forks 39 and 41 are provided to slide the clutch member 33 and the gear member 31 respectively. Fork 39 is carried by a slidable rod 43 and fork 41 is carried by a slidable rod 45. The forks have lugs 49 upstanding from their flat surfaces 51 and between these lugs are received the ends 53 of a lever 55 resting upon and supported by the flat surfaces 51. The lever has an opening 56 to receive the end of the shift lever 17. From an examination and a comparison of Figs. 1 and 2, it will be seen that the lower end of lever 17 is shaped and dimensioned to occupy substantially the whole of the length of the opening 56, but that it has movement transversely of the opening.

Above the lever 55 is an interlocking plate 57. Its mid portion is raised as at 59 and this portion is provided with a slot 61 of which the long dimension extends longitudinally of the gear housing. Its shorter dimension is such as to fit snugly the lower end of the shift lever 17. This will be clear from an inspection of Fig. 1 and Fig. 2. The plate 57 has end portions 63 resting on the lever 55. Slots 65 and 65′ are cut into the ends forming lugs 67 and 67′. The bases of the slotted portions are formed with arcuate surfaces, which latter are provided with notches 69, 69. It will be observed that the length of slot 65 is less than the length of slot 65′. The purpose of these unequal dimensions will be explained below. Pins 71 are fixed one in each end of the lever 55. These pins are designed to enter the one or the other of the notches 69

Fastening means 73 secure angle plates 75, 75′ to the undersides of the cover 13. The vertical flanges of these angle plates are of arcuate form and enter the grooves 65, 65′ of the interlocking plate 57 and engage the inner edges of the lugs 67, 67′ as will be seen from the diagrammatic views. Supported by the interlocking plate is a stamping 77 and a spring 79, the latter engaging the shift lever to maintain it in normal position.

In the mid portion of the gear shift lever the parts are as shown in Fig. 1 and also in the second of the three diagrams of Fig. 4. In this position the clutch 33 and gear 31 are so held by the shift mechanism as to be out of engagement with their respective cooperating elements. Lever 55 occupies a substantially transverse position at right angles to the transmission housing and as shown in the second of the three diagrams of Fig. 4. The interlocking plate 57 is in its mid position. Its lugs 67 and 67′ are engaged by the ends of the guiding angle plates 75, 75′, the vertical walls of which project about equally into each slot because of the mid position of the interlocking plate. The notches of the interlocking plate are each partially engaged by the pins 71 on the ends of the lever 55. The pins are in contact with the arcuate vertical guiding walls 75, 75′ so that no transverse movement of the lever 55 may take place.

If the shift lever is moved transversely it moves the interlocking plate in a similar way. One of the guide plates 75, 75′ is then moved more deeply into the groove at one end of the interlocking plate, and the other guide plate is located less deeply (see Fig. 4) but both guide plates are still within the grooves of the interlocking plate so that this plate may have no longitudinal movement. The notch at one end of the interlocking plate has moved away from the pin 71 while at the other end the notch more completely embraces the pin 71. Fig. 4 shows both positions of transverse movement. In so moving the interlocking plate, the shift lever has not moved the second lever 55 transversely of the housing, such movement being prevented by the engagement of the pins 71 with the depending walls of the guiding angle plate 75, 75′ The dimensions of the opening 56 permit the described movement of the shifting lever without any movement of the second lever.

After moving shifting lever 17 transversely it is then to be moved longitudinally for gear shifting. It should be kept in mind that the shifting is restricted to interlocking plate 57 and that it moves transverse movement only and that it moves transversely with the shifting lever because of the narrow dimensions of the slot 61. The slot 61, is, however, elongated and after the combined transverse movement of the shifting lever and interlocking plate the shift lever is free to move longitudinally relative to the interlocking plate with no movement of the latter. Also, in the transverse movement of the shift lever it has moved from the mid position of slot 56 of the lever 55 to a position adjacent one side thereof. Longitudinal movement of the shift lever then exerts a longitudinal pressure upon the lever 55 which is held from such movement at one end by its pin 71 which is now embraced by the notch 69 of the interlocking plate, this interlocking plate having no longitudinal movement as explained above. Therefore, the longitudinal movement of the shift lever effects a rotation of lever 55 about its anchored end as will be apparent from an inspection of Fig. 4. One end of the lever is held by the engagement of pin 71 in the notch 69. The other end is travelling on an arc having as a center the point of contact between 71 and the depending wall of angle plate 75 or 75′. It will be understood that the radius of the arcuate surfaces of the depending walls of the guide plates 75 and 75′ should be such as to accommodate this movement. The movement of the free end of the lever 55 moves the fork with which it is associated by the engagement of its end 53 between the lugs 49.

In cases where the transmission is such that a greater longitudinal movement from the mid position is required for one fork than for the other, this result is easily secured by locating the opening 56 of the fork off center. By so locating the opening the movements of the lever are greater when shifting about one end than when shifting about the other end. This will be clear from an inspection of Fig. 4. By this means unequal movements of the shift forks are obtained with equal movements of the shift lever knob. It is to accommodate such unequal movements at the ends of the lever 55 that the notches 65 and 65′ and the guiding parts 75, 75′ are unequally dimensioned.

Figs. 5 and 7 show a second embodiment. In this form of the invention the shift lever 17 is similarly mounted in the cover 13 of the casing 11. The shift forks 39′ and 41′ are much like 39 and 41 but have upwardly projecting pins 81 circular in section for a part of their height but semi-circular at their tops as at 83.

The lever 55′ differs from the lever 55. It has an off center opening 56' for the lower end of the shift lever as before. One end 85 has a circular opening 87 to receive the circular lower end of pin 81 on shift fork 39'. The other end is notched as at 89 to partially embrace the opposite pin 81 on the other shift fork. The interlocking plate 57' has an elongated opening 91 shaped to permit relative longitudinal movement of the shift lever but to cause the plate 57' to move transversely with the shift lever. At the ends of the interlocking plate 57' are substantially rectangular openings 93 and 93'. Opening 93 has a notch 95 extending therefrom to receive and partially embrace the top 83 of the pin 81 of the fork 41' as shown in Fig. 7. A corresponding notch 95' is formed in the outer wall of the rectangular opening 93' to receive the top 83 of pin 81 of the fork 39'. To accommodate the longer arcuate movement of pin 81 on fork 39', opening 93' is of greater width than opening 93 and has extensions 97 as shown.

In operation, when the parts are in neutral position, the shift lever is in the mid position of slot 91 and when in this mid position the notches 95 and 95' are positioned to engage the tops 83 of the two pins 81. When the shift lever is moved transversely into the position shown by Fig. 5 and by dotted lines in view 2 of Fig. 7 one pin, that on fork 41', is more completely engaged within the notch 95' of the interlocking plate 57', and the opposite pin head 83 is freed from the notch at the other end of plate 57'. If now the shift lever is moved longitudinally it turns the lever 55' about the pin 81 of fork 41', the head 83 of the opposite pin 81 moving freely in the openings 93. Lugs 99, secured at 101 to the underside of the cover, slide along the walls of the openings 93 and 93' to prevent the interlocking plate 57' from moving in any direction except transversely of the housing. That one of the pins which is held by the notch 95 or 95' from moving longitudinally becomes the fixed center for the rotation of the lever 55' since the notch engaging the pin is located in the shift plate 57' which is held from longitudinal movement.

In Fig. 6 and Fig. 8 is another form of the invention somewhat similar to that shown by Figs. 1 to 4. The interlocking plate 57" has openings at 103 and 103' with notches 105. The lever 55" carries pins 106 which are movable in the openings and notches. The ends of the lever are received between lugs on the forks. The cover is provided with guiding angle plates 107 and 107' which are located on the inner side of the pins 106 instead of outwardly thereof as in Fig. 1. These arcuate guiding plates 107 and 107' by engagement with the pins hold the lever 55" from transverse movement. The guides 107 and 107' engaging as they do the walls of the slots 103 and 103' restrain the interlocking plate 57" to transverse movements only. In other respects this form is substantially like the others.

In each of the several forms the shift lever in moving transversely moves the interlocking plate in the same direction which movement of the interlocking plate and shift lever locks from longitudinal movement one end of the second lever, the two ends of which are associated with the two forks. Thereafter longitudinal movement of the shift lever rocks the second lever about its anchored end and swings the other end of the lever together with the fork with which it is associated. Unequal movements of the shift mechanism are provided to accommodate equal movements of the knob of the shift lever by means of the unsymmetrical location of the point of engagement between the shift lever and the second lever.

I claim:

1. In change speed mechanism, a housing, shift forks, a shift lever, a second lever operably related to the shift lever, each end of the second lever associated with one of the shift forks, means to restrain the second lever from transverse movement, and means to anchor one end only of the second lever from longitudinal movement by a transverse movement of the shift lever, whereby longitudinal movement of the shift lever may produce arcuate movement of the second lever about its anchored end and a consequent longitudinal movement of the shift fork associated with the movable end of the second lever.

2. The invention defined by claim 1, said means to restrain the second lever from transverse movement comprising members carried by said second lever and guide means carried by said housing and engaged by said members.

3. The invention defined by claim 1, said means to restrain the second lever from transverse movement comprising members carried by said lever and guides fixed to said housing and engaged by said members, and said means to anchor one end of said second lever comprising an interlocking plate moved transversely by transverse movements of the shift lever in sliding engagement with said guides to prevent longitudinal movement, pins on the ends of said second lever, said interlocking plate constructed to engage the pin on the one or the other end of said second lever.

4. The invention defined by claim 1, said means to restrain the second lever from transverse movement comprising pins carried by the shift forks and said lever having openings engaging said pins.

5. The invention defined by claim 1, said means to restrain the second lever from transverse movement comprising pins carried by said shift forks, said lever having openings engaged by said pins, and the said means to anchor one end of the lever from longitudinal movement comprising guides on the housing, an interlocking plate moved transversely by the transverse movements of the shift lever and engaged with said guides to prevent longitudinal movement, said interlocking plate constructed to engage the one or the other of said pins when moved into transverse positions of adjustment.

6. In change speed transmission, a housing, shift forks therein having opposed heads, spaced lugs on said heads, a shift lever, a second lever having ends positioned between said lugs, said shift lever operably engaging said second lever between its ends, guide lugs on said housing, an interlocking plate guided for transverse movement by said guide lugs, said interlocking plate engaged with said shift lever to be moved therewith in the transverse movements of the latter, pins on the ends of the second lever, said interlocking plate constructed to engage the one or the other of said pins when moved transversely whereby the fork engaged by the end of the lever which is anchored by the engagement of its pin in the interlocking plate is restrained from longitudinal movement and whereby the other fork is free to be moved longitudinally upon the arcuate movement of the second lever about its anchored end.

7. In a change speed transmission, shift forks, a shift lever, a second lever operably engaged by the shift lever and terminally engaging the shift forks, means to restrain the second lever from transverse movements, means to anchor one or the other of the lever ends and a fork with which it is associated by transverse movement of the shift lever whereby longitudinal movement of the shift lever produces an arcuate movement of the second lever and a reciprocating movement of the other fork.

8. The invention defined by claim 7, said shift lever engaging the second lever at a point unequally distant from its ends whereby equal movements of the shift lever may produce unequal movements of the shift forks.

In testimony whereof I affix my signature.

PERRY L. TENNEY.